May 7, 1935.　　　　J. H. CANNON　　　　2,000,318
CORD CONNECTER
Filed May 22, 1933　　　2 Sheets-Sheet 1

INVENTOR:
James H. Cannon,
BY
ATTORNEY.

May 7, 1935.  J. H. CANNON  2,000,318
CORD CONNECTER
Filed May 22, 1933  2 Sheets-Sheet 2

INVENTOR:
James H. Cannon,
BY
ATTORNEY.

Patented May 7, 1935

2,000,318

UNITED STATES PATENT OFFICE 2,000,318

CORD CONNECTER

James H. Cannon, Los Angeles, Calif.

Application May 22, 1933, Serial No. 672,125

7 Claims. (Cl. 173—328)

My invention relates to separable connecters of the character employed with electric conductors, such as cables and cords, and relates in particular to a connecter especially suitable for all uses where the circuits formed through the cords or cables must be positively and constantly maintained in order to avoid accidental interruption or fluctuation of the electrical currents flowing in the respective circuits.

My invention is especially suited to use in forming electrical circuits in sound recording and reproducing equipment such as now employed in the motion picture industry wherein various pieces of electrical apparatus must be connected into main circuits through the use of electrical cords and cables. An interruption of the flow of energy in any one of the circuits may result disastrously and necessitate the duplication of considerable work. For example, in the photographing or taking of a sound motion picture, the camera and the microphone are connected through electrical cords or cables with sound recording equipment. An interruption or fluctuation of the microphone circuit will ruin the sound record, and the interruption of current flow to the camera motor will result in throwing the camera out of synchrony with the motors of the recording equipment.

My invention has for an object to provide a connecter in which perfect and positive electrical engagement of the electric circuit forming members is attained, and which is of simple and rugged construction.

It is a further object of the invention to provide a connecter comprised of interengaging parts having cooperating contacts therein and being provided with a simple and effective form of catch or locking means which will prevent accidental separation of the connecter members, but which may be released quickly when separation of the connecter members is desired. It often occurs that a tension is exerted on the cable, due, for instance, to a workman tripping over a cable, which tension will tend to disconnect the connecter members, thereby interrupting the electrical circuits formed therethrough. The lock or catch means of my invention positively prevents separation of the connecter parts in such an accidental manner, so that losses due to accidental interruption of circuits from this source are avoided.

A further object of the invention is to provide an improved form of contact member and means for operatively holding said contact member in the plug structure in a floating position so that it is subject to centering movement and accordingly is not subject to lateral forces which might cause such movement of the relative contact parts as to break the circuit or cause the same to fluctuate.

A further object of the invention is to provide an angle-type connecter having a removable cap whereby the contacts may be exposed during the connection of the wires thereto and for the purpose of inspecting the connections which have been made.

Further objects and advantages of the invention will be made evident throughout the following part of the specification.

Referring to the drawings, which are for illustrative purposes only,

Figure 1:
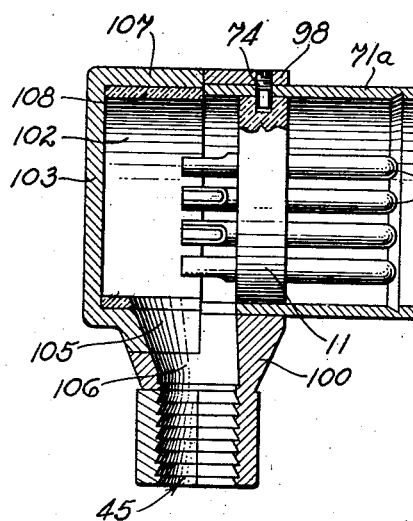
Fig. 1 is a vertically sectioned view of a preferred form of angle connecter member.
Figure 2:
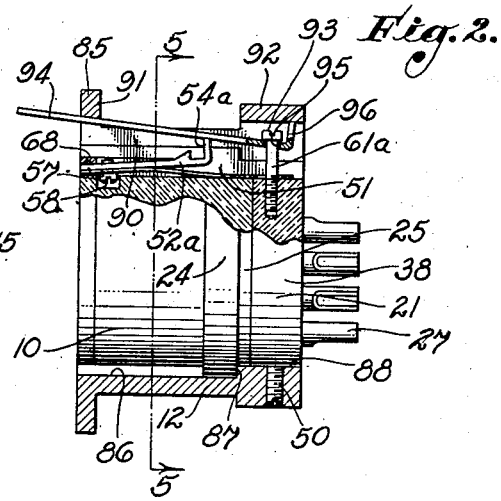
Fig. 2 is a vertically sectioned view showing a connecter member adapted to be mounted in a wall and adapted to cooperate with the connecter shown in Fig. 1.
Figure 4:
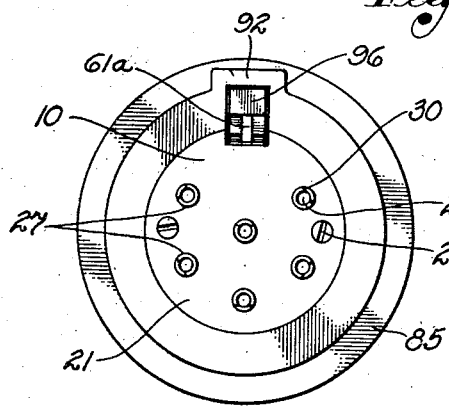
Fig. 4 is a view looking toward the rightward end of the connecter shown in Fig. 2.
Figure 5:
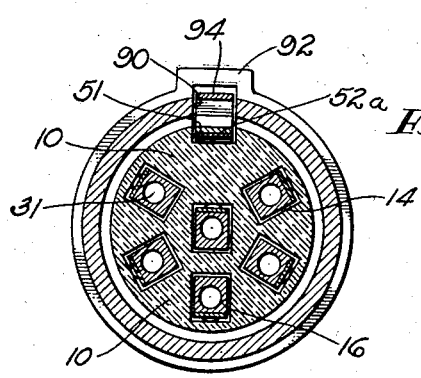
Fig. 5 is a cross section on a plane represented by the line 5—5 of Fig. 2.
Figure 6:
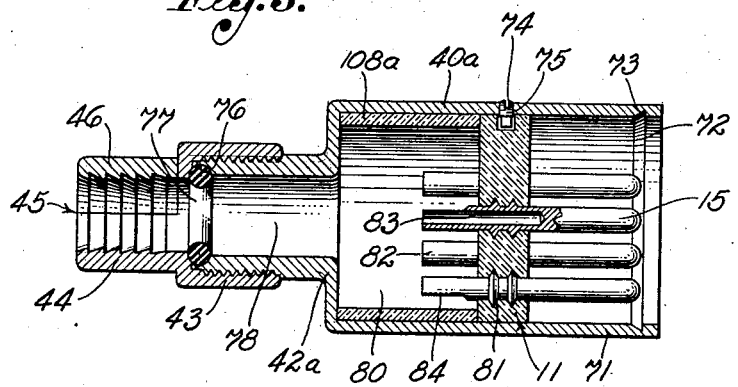
Fig. 6 is a vertically sectioned view of a connecter similar to the connecter shown in Fig. 1, but adapted for rectilinear attachment to a cord.
Figure 7:
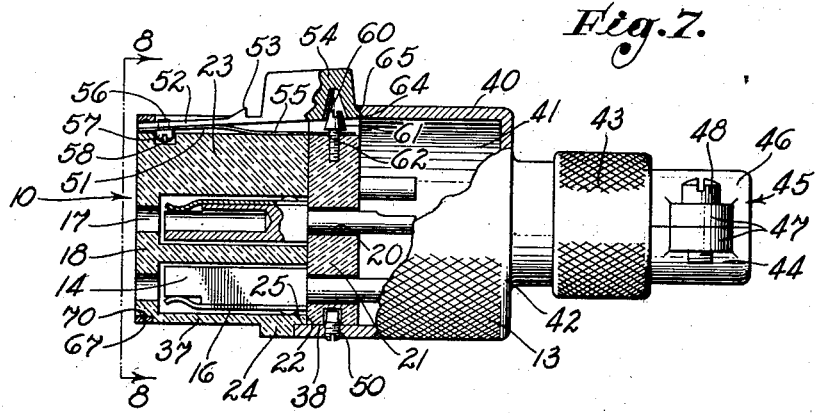
Fig. 7 is a partly sectioned view of a cord connecter adapted for interengagement with the connecter shown in Fig. 6.

In my invention I prefer to employ, as shown in Figs. 2 and 7, a primary connecter body 10 and, as shown in Figs. 1 and 6, a secondary connecter body 11 adapted for use in a number of different forms of connecter members. As shown in Figs. 2, 4, 5, 7, and 8, the primary connecter body 10 is of cylindrical form and is adapted to be mounted in an opening provided by a suitable supporting structure, such as the wall fitting 12 of Fig. 2 or the cord connecter fitting 13 of Fig. 7. In its preferred form, the member 10 is cylindrical so that circular ends are presented thereby. The member 10 provides a simple, rugged, and effective means for supporting a plurality of contact elements 14, which are preferably of socket type, in position to receive pin-type contact elements 15 supported by the secondary connecter body 11 operatively held in a cooperating connecter fitting of the character shown in Figs. 1 and 6.

The primary connecter body 10 has a plurality of longitudinally elongated chambers or recesses 16 therein which are of rectangular cross section, as shown in Fig. 5, and each of which chambers 16 has a forward opening 17 in the front wall 18 of the body 10 and a rear opening 20 in the rear wall 21 of the body 10. To provide access to the chambers 16 so that connecter elements 14 may be placed therein, one of the end walls of the body 10 is detachably secured. In my present invention the rear end wall 21 comprises a separate circular disc of molded insulating material adapted to be secured by means of screws 21a, as shown in Fig. 4, to the inner or rearward end face 22 of a body part 23 forming the outer or forward portion of the primary connecter body 10 and having a flange or bead 24 near the rearward end face 22 thereof, but being spaced from the end face 21, as shown in Figs. 2 and 7, so as to provide a rearwardly projecting cylindrical portion 25 having the same diameter as the rear wall 21.

Figure 9:
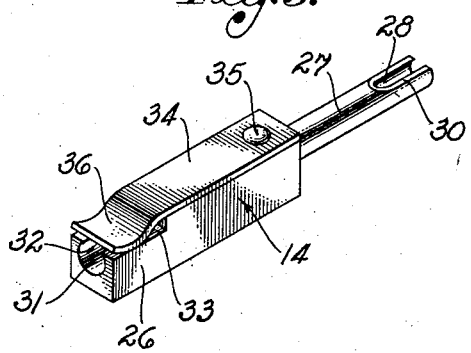
Fig. 9 is a perspective view of a preferred form of socket contact element employed in the practice of my invention.

The socket contact elements 14 are constructed as shown in Fig. 9. They each consist of a body portion 26 preferably made from square metal stock, this body portion 26 having the rearward end thereof turned down to form a projecting stem 27 which is in turn provided with a drilled opening 28 into which a wire of a cable may be soldered, it being preferable to chamfer off the end or stem 27, as shown at 30, so as to form a solder receiving trough at the end of the opening 28. From the forward end of the body 26 an opening 31 is drilled, of sufficient depth to receive a pin contact element 15, and a side opening 32 is provided communicating with the opening or bore 31 by removing a portion of the wall formed by said body 26 around the opening 31. This side opening 32 may be formed at the forward extremity of the body 26 by cutting away a portion of the body, as shown at 33. An essentially flat spring member 34 is then secured to the body 26 by some suitable means such as a rivet 35 at the rearward end of the body 26, in such position that the forward end or engagement portion 36 of the spring 34 will lie across the side opening 32 of the opening or socket 31 of the body 26. The spring member 34 is preferably made from stiff spring bronze so that the strength and resilience thereof will be maintained for a maximum period of time, and the inner face of the engagement end 36 is disposed in such position across the side opening 32 that the diametral dimension from the inner face of the engagement end 36 to the opposite surface of the bore or socket 31 will be materially less than the diameter of a pin contact element 15, the result being that when a pin contact element 15 is moved into the socket 31, the forward end of the spring 34 will be deflected outwardly and will press forcibly against one side of the pin contact element 15 and will accordingly force the pin contact element 15 into tight engagement with the wall of the socket 31 opposite the engagement end 36 of the spring 34. The spring 34 is initially placed under tension, and the pressure with which it engages a pin contact element 15 results in a cleaning action of the parts of the pin 15 engaged by the engagement end 36 of the spring 34 and the wall of the member 26 around the socket 31, with the result that a perfect electric contact of the pin and the socket contact elements 14 is attained. Separable contact elements are customarily formed in multipull connecter devices of the general character disclosed herein consisting of a sleeve adapted to receive a pin, such pin being split longitudinally so as to provide a pair of forks which may be spread apart so that they will frictionally engage the interior surface of the sleeve. Such split contact pins soon are deformed so that there is no assurance that a perfect electrical contact thereof with the cooperating sleeve will be maintained. In my device, however, a perfect electrical contact is assured for the reason that the spring engagement between the contact elements is produced by the use of a separate tempered bronze spring 34 which may be flexed repeatedly without losing its strength, and for the further reason that the body 26 of the socket contact element 14 is materially smaller than the chamber 16, and the stem 27 is smaller than the opening 20 in the rear wall 21, so that the socket contact element 14 may move transversely in the chamber 16 into practical alignment with the cooperating pin contact element 15. Accordingly, no strains are placed upon the spring 34 during the insertion of the pin contact element 15 other than the mere deflection of the spring 34 due to the engagement end 36 thereof being forced outwardly relative to the forward end of the body 26 as the pin 15 enters the socket 31. The openings 17 in the forward end wall 18 of the cooperating body part 23 are of larger diameter than the pins 15, so that the pins 15 may readily enter the holes even though there is a slight disalignment thereof.

The cooperating cylindrical parts 21 and 23, when secured together by the screws 21a, form an essentially cylindrical primary connecter body having an intermediate, radially projecting flange or rib 24 disposed between two oppositely extending cylindrical walls 37 and 38. The casing or fitting 13 has a cylindrical wall 40 of a size to receive the rearwardly extending cylindrical wall portion 38 of the primary connecter body 10, and this wall 40 is of such length that when the leftward or outer end or lip of the wall 40 engages the rib 24 of the body 10, a chamber 41 is left within the fitting 13 for accommodation of the rightwardly projecting ends of the stem 27 and the ends of wires which are connected thereto. The rightward end of the wall 40 is constricted at 42 to join a cylindrical extension 43 through which a cable or cord is adapted to extend into the chamber 41, and the outer end of the tubular extension 43 is provided with a semi-circular wall 44 forming a part of a cord clamp 45, which clamp 45 also includes a separable semi-circular part 46, the parts 44 and 46 each having a pair of diametrally extending lugs 47 for receiving screws 48 by which the separable part 46 may be tightened down against a cable which lies in the semi-circular part 44. The primary connecter body 10 is secured in the shell or fitting 13 by means of screws 50 which extend through the wall 40 into engagement with the cooperating part 21 of the body 10.

Figure 8:
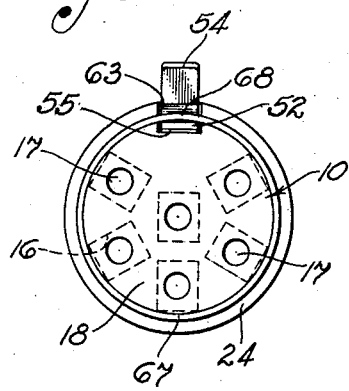
Fig. 8 is a view of the front end of the connecter shown in Fig. 7, this view being taken from a plane indicated by the line 8—8 of Fig. 7.

A further feature of the invention resides in the simple catch or locking means formed in conjunction with the body 10 for releasably securing complementary connecter members together. As shown in Figs. 2, 4, 5, 7, and 8, the primary connecter body 10 has a longitudinal groove 51 in the outer face thereof, which groove preferably extends from end to end of the body 10 and is preferably of rectangular cross section. This groove is adapted to receive a catch member which has essentially the same characteristics in both the forms of the invention shown in Figs. 2 and 7. As shown in Figs. 7 and 8, the catch means includes a catch member 52 of flat strip form of a width to fit within the groove 51, and having on the outer face thereof an outwardly projecting catch dog 53, and rearwardly of the dog 53 an outwardly projecting metal body 54 forming a manually engageable button whereby the catch member 52 may be swung inwardly from the position in which it is shown in Fig. 7 so as to carry the catch dog inwardly to a retracted position. Beneath the catch member 52 within the groove 51 is a flat leaf spring member 55 which is preferably laminated and the forward end of which is preferably secured to the under face of the catch member 52 by use of a screw 56 having a head 57 thereon which projects into a recess or opening 58 in the bottom wall of the groove 51 near the forward end thereof. It will be perceived that the engagement of the head 57 with the recess 58 resists longitudinal movement of the catch member 52 in the groove 51. The rearward end of the catch member 52 has a tapered socket or recess 60 formed in the under face thereof adapted to engage the conical head of a screw 61 which projects through an opening 62 in the rearward end of the spring 55 into threaded engagement with the cooperating part 21 of the body 10. It will be perceived that the screw 61 in conjunction with the socket 60 provides means of interengagement between the body 10 and the catch member 52 which also resists longitudinal movement of the catch member 52 but does not prevent outward movement of the rearward end of the catch member necessary to accomplish a projection of the catch dog 53 from the cylindrical face of the body 10. The rightward or rearward end of the catch member extends into an open notch 63 in the wall 40 of the fitting 13, and the rightward end of the catch member 52 is provided with a projection 64 which extends under a sloping wall surface 65 at the inner end of the open notch 63 in such a manner that engagement of the projection 64 with the sloping wall surface 65 limits the outward swinging movement of the rightward or inner end of the catch member 52 relative to the body 10.

My invention also provides a reinforcing ring 67 disposed around the forward end of the body 10 and passing over the forward end of the groove 51 so as to form a bridge 68 under which the leftward or outer extremity of the catch member 52 may extend, as shown in Fig. 7, thereby preventing an outward movement of the catch member 52 relative to the groove 51. The ring 67 is especially advantageous as a protector for the end portion of the primary connecter body 10 which, being made of a relatively hard insulating material such as a phenolic condensation product, would be broken when the connecter shown in Fig. 7 is being handled or dragged across the floor were it not for the presence of the protector ring 67 which is molded in place on the end of the body 10 and is keyed thereto by reason of the fact that the ring 67 has a groove 70 in the inner face thereof into which the material of the body 10 projects. The complementary connecter member shown in Fig. 6 has a cylindrical wall 40a which is of such length as to provide a forwardly projecting cylindrical guard wall 71 of such internal diameter that the projecting end or wall portion 37 of the body 10 will pass thereinto in such a manner that the pin contact elements 15 will project through the openings 17 in the body 10 into engagement with the contact elements 14 carried by the body 10. Adjacent the rightward end of the wall 71 a depression 72 is cut so as to provide a shoulder 73 which will be engaged by the catch dog 53 of the catch member 52 when the cooperating connecter members of Figs. 6 and 7 are in interengagement. The depression 72 may satisfactorily consist of a circular groove formed in the inner face of the wall 71, as shown. The body 10 cannot be removed from within the projecting wall 71 until release of the catch dog 53 with the shoulder 73, which is accomplished by pressing the projecting metal body or button portion 54 of the catch member 52 inwardly against the action of the spring 55.

The secondary connecter body 11, as shown in Fig. 6, comprises a disc of molded insulated material held in a transverse position within the cylindrical wall 40a and intermediate the ends thereof by means of screws 74 which project through openings 75 in the wall 40a into threaded engagement with the body 11, as shown in Fig. 6. The wall 40a of Fig. 6, like the wall 40 of Fig. 7, is constricted at 42a to join a tubular extension 43 identical with the tubular extension 43 of Fig. 7 and having clamping means 45 clamped thereon. Within the extension 43 a circular groove 76 is formed, and in this groove 76 a resilient rubber ring or bushing 77 is placed, which bushing has the purpose of supporting within the opening 78 of the extension 76 such cable or cord as may be extended through the opening 78 into the chamber 80 formed within the wall 40a.

The pin contact elements 15 are made from bar metal and have ribs 81 formed thereon in position to be embedded within the body 11 during the molding thereof, whereby the pins 15 will be firmly secured in the body 11. The rearward ends 82 of the contact pins 15 are drilled in the same manner as the shanks 27 of the socket contact elements 14 so as to provide axial openings 83 to receive the ends of wires, and the ends 82 of the pins 15 are preferably chamfered in the manner shown at 84 to facilitate soldering the wires in place.

In Fig. 2 the primary connector body 10 is shown mounted in a wall fitting 12 having a flange 85 at the leftward or outer end thereof and having a bore 86 leading inwardly from the face of the flange 85 to a shoulder 87 formed by a bore 88 of reduced diameter at the rearward end of the fitting 12. The diameter of the bore 86 is essentially the same as the external diameter of the rib 24 so that the rib 24 will slide rearwardly into the bore 86, and the bore 88 is of a diameter to fit closely about the cylindrical wall or portion 38 of the body 10 extending rearwardly from the rib or flange 24. As shown in Fig. 2, the body 10 is held in the wall fitting 12 by means of screws 50. In this form of the invention the catch means has a catch member 52a which is shorter than the catch member 52 of Fig. 7 and has a toe or lug 54a which projects outwardly from the groove 51 of the body 10 into a longitudinal groove 90 formed in the fitting 12. Over the leftward or forward end of the groove 90 the flange 85 forms a wall 91, and at the rearward end of the groove 90 an overlying arch 92 is formed, as shown in Figs. 2 and 4. The spring 55 preferably extends the full length of the groove 51, and through the opening 62 in the rightward or rearward end thereof a relatively long screw 61a is extended into engagement with the body 10. The head 93 of the screw 61a extends outwardly or upwardly into the arch 92, and on the upper end of the screw 61a an actuating lever 94 is mounted, this actuating lever 94 having an opening 95 near its rearward end adjacent an upwardly turned dog or toe 96 which is adapted to engage the upper wall of the arch, and the lever 94 is of such length that it will extend through the groove 90 and project from the face of the flange 85. When the catch member 52a is in projecting or raised position, as shown in Fig. 2, the lever 94 slopes upwardly and engages the bridge or wall 91 over the forward end of the groove 90. By forcing downwardly or inwardly upon the projecting end of the lever 94, such lever 94 may be caused to swing inwardly toward the body 10, transmitting an inward movement to the projection 54a of the catch member 52a to swing the catch member 52a into a retracted position in the groove 51.

My invention readily adapts itself to angle connecter fittings such as shown in Fig. 1, which include a cylindrical wall 71a set within a ring or annular wall 98 formed at the end of a tubular wall 100 which is similar to the tubular extension 43 of Figs. 6 and 7 in that it has cable clamping means 45 formed at the end thereof. Within the cylindrical wall 71a and the ring 98 a secondary connecter body 11, having pin contacts 15 supported therein, is secured by means of screws 74, and a chamber or wire-receiving space 102 is formed adjacent the leftward or inner end of the secondary connecter body 11 by means of a cup-shaped metal cap 103 adapted to be secured to the ring 98 by means of screws 104. The cap 103 has a groove 105 therein positioned so as to form an extension of the opening 106 through the member 100 communicating with the chamber 102, and it is preferable to mount within the cylindrical wall 107 of the cap 103 a cylindrical wall 108 of insulating material to prevent engagement of electrical conductors with the side wall of the cap 103. Likewise, similar insulating walls, such as the cylindrical wall 108a of Fig. 6, may be employed in other forms of the invention for similar protective purposes.

Figure 3:
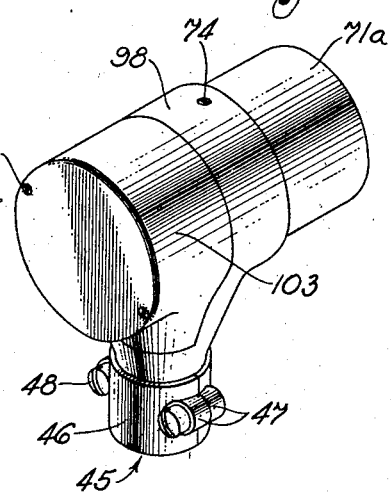
Fig. 3 is a perspective view of the connecter shown in Fig. 1.

Multi-conductor electric cables cannot be readily bent around sharp corners, and accordingly the form of my invention shown in Figs. 1 and 3 provides for the connecting of the conductors of the cable to the contact pins without necessity of bending the cable. The cap 103 may be removed so as to expose the inner ends 83 of the contact pins 15, and the end of a cable is then projected through the opening 106 of the member 100 into the space lying to the left of the body 11, whereupon the wires may be quickly connected to the contact pins 15 without necessity of removing the body 11 and without necessity of bending the cable. The cap 103 may be then replaced to protect the connections which have thus been made, and such cap 103 may be removed at any time for the purpose of inspecting the cable without necessity of removing the body 11 or of bending the end of the cable as would be necessary in the sliding of the cable upwardly through the opening 106 in order to move the body 11 out of the cylindrical wall 71a.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A connecter of the character described, including: primary and secondary connecter members adapted for interengagement, said primary member comprising a body having a longitudinal groove along the outer face thereof, and said secondary member having a tubular wall to extend over said body of said primary member, there being a shoulder in the inner face of said tubular wall; a catch member lying in said groove of said body, said catch member having a catch dog on the outer face thereof to engage said shoulder in said tubular wall; a relatively thin metal wall on one end of said body forming a bridge across the forward part of said groove and over one end of said catch member for holding said end of said catch member in said groove; a wall on the opposite end of said body for limiting the outward movement of the opposite end of said catch member relative to said groove; a spring coextensive with said groove for yieldably moving said catch member outwardly a limited distance to keep said dog in engagement with said shoulder when said connecter members are in interengagement; a stop on said catch member adapted for engagement with said body to prevent endwise movement of said catch member and said spring in said groove; and a manually operable projection on said catch member for moving the latter inwardly so as to move said dog from engagement with said shoulder to permit separation of said connecter members.

2. A connecter of the character described, including: primary and secondary connecter members adapted for interengagement, said primary member comprising a body having a longitudinal groove along the face thereof, and said secondary member having a tubular wall to extend over said body of said primary member, there being a shoulder in the inner face of said tubular wall; a catch member lying in said groove of said body, said catch member comprising a flat elongated metal strip having a catch dog on the outer face thereof to engage said shoulder in said tubular wall; a ring embedded in said body forming a bridge across the forward part of said groove and over one end of said catch member for holding said end of said catch member in said groove; a wall on the opposite end of said body for limiting the outward movement of the opposite end of said catch member relative to said groove; a flat spring in said groove extending between said ring and said wall for yieldably moving said catch member outwardly a limited distance to keep said dog in engagement with said shoulder when said connecter members are in interengagement; stop means engaging said catch member for preventing endwise movement of said member and said spring in said groove; and a manually operable projection on said catch member for moving said catch member inwardly so as to move said dog from engagement with said shoulder to permit separation of said connecter members.

3. A connecter of the character described, including: primary and secondary connecter members adapted for interengagement, said primary member comprising a body of insulating material having a longitudinal groove along the face thereof, and said secondary member having a tubular wall to extend over said body of said primary member, there being a shoulder in the inner face of said tubular wall; a catch member lying in said groove of said body, said catch member having a catch dog on the outer face thereof to engage said shoulder in said tubular wall; a reinforcing ring around the forward end of said body, a portion of said ring forming a bridge over the forward end of said groove and over the forward end of said catch member; a fitting on the rear end portion of said body having a wall surface for limiting the outward movement of said catch member in said groove; a flat spring coextensive with said groove for yieldably moving said catch member outwardly a limited distance to keep said dog in engagement with said shoulder when said connecter members are in interengagement; a stop element engaging said catch member for preventing endwise movement of said catch member and said spring in said groove; and a manually operable projection for moving said catch member inwardly so as to move said dog from engagement with said shoulder to permit separation of said connecter members.

4. A connecter of the character described, including: a primary connecter member and a secondary connecter member adapted for interengagement; cooperating contact members carried by said primary and secondary connecter members; walls forming a groove coextensive with said primary member; a shoulder disposed interiorly of said secondary connecter member; a catch member in said groove having a dog adapted to engage said shoulder; a fitting attached to said primary connecter member having an inwardly sloping edge wall surface; a flat spring in said groove for yieldably moving said catch member outwardly a limited distance to keep said dog in engagement with said shoulder when said connecter members are in interengagement; a ring secured to the forward end of said primary connecter member and encircling the forward ends of said catch member and said spring; walls providing a recess in said primary connecter member; a screw connecting the forward ends of said catch member and said spring and having a portion projecting within said recess so as to prevent endwise movement of said catch member and said spring in said groove; a button on said catch member movable inwardly to release said dog from engagement with said shoulder; and a projection on said button engageable with the sloping edge wall of said tubular fitting to limit the outward movement of said catch member in said groove.

5. A connecter of the character described, including: primary and secondary connecter members adapted for interengagement, said primary member comprising a body of insulating material having a longitudinal groove along the face thereof, and said secondary member having a tubular wall extending over said body of said primary member, there being a shoulder in the inner face of said tubular wall; a catch member lying in said groove of said body, said catch member having a dog adapted for engagement with said shoulder in said tubular wall; a connecter fitting on said primary connecter member body having a notch providing an inwardly sloping edge portion; a spring coextensive with said groove for moving said catch member outwardly to keep said dog in engagement with said shoulder, said body having a recess, there being a screw in said recess connecting between said catch member and said spring so as to prevent endwise movement of said catch member and said spring in said groove; and a button on said catch member having a projection thereon adapted for engagement with the sloping edge portion of said connecter fitting for limiting the outward movement of said catch member.

6. A connecter of the character described, including: primary and secondary connecter members adapted for interengagement, said primary member comprising a body of insulating material having a longitudinal groove along the face thereof and said secondary member having a tubular wall extending over said body of said primary member, there being a shoulder in the inner face of said tubular wall; a catch member lying in said groove of said body, said catch member having a dog adapted for engagement with said shoulder in said tubular wall; a connecter fitting on said primary connecter body having a notch providing an inwardly sloping edge portion; a spring associated with said catch member in said groove for moving said dog outwardly into engagement with said shoulder; walls providing a recess in said primary connecter body; a screw connecting said catch member and said spring and having a portion thereof projecting into said recess; a ring carried on the outer end of said primary connecter body and bridging the outer ends of said catch member and said spring, said screw cooperating with said ring to prevent longitudinal displacement of said catch member; and a manually operable projection on said catch member for moving said dog inwardly from engagement with said shoulder, said projection having an outwardly extending portion adapted for engagement with the sloping edge portion of said connecter fitting for limiting the outward movement of said catch member.

7. A connecter of the character described, including: a casing having a body receiving opening, there being a shoulder disposed adjacent the end of said opening; a wall in said casing supporting a plurality of contact pins; a body of insulating material adapted to be received in said casing in axial alignment with said opening, said body having therein a plurality of axially elongated chambers; a wall secured to said body having a plurality of openings communicating with said chambers; conductor members loosely mounted in said chambers and having stems projecting through said wall openings, said conductor members each comprising a metal bar having sockets for the reception of said contact pins; a flat metal spring secured to the exterior of each of said bars in position to forcibly bear against said contact pins when said casing and said body are in interengagement; a fitting attached to said body wall into which said conductor member stems project; walls providing a longitudinal groove along the face of said body; a catch member lying in said groove, said catch member having a catch dog on the outer face thereof to engage said casing shoulder; a flat spring coextensive with said catch member in said groove for yieldably moving said catch member outwardly to keep said dog in engagement with said shoulder; a reinforcing ring around the forward end of said body for holding one end of said catch member in said groove; walls forming a recess in said body; a stop element engaging said catch member and having a portion projecting within said recess for preventing endwise movement of said catch member in said groove, said fitting providing an inwardly sloping wall surface engageable by the other end of said catch member when said catch member is moved outwardly by said spring so as to limit the outward movement of said catch member; and a projection on said catch member movable inwardly to release said dog from engagement with said casing shoulder.

JAMES H. CANNON.